Fig. 1.

May 20, 1947.  S. L. GOLDSBOROUGH ET AL  2,420,878
LOSS-OF-LOAD RELAYING
Filed April 20, 1944  3 Sheets-Sheet 3

INVENTORS
Shirley L. Goldsborough
and Harvey P. Sleeper.
BY O. B. Buchanan
ATTORNEY Patented May 20, 1947

2,420,878

UNITED STATES PATENT OFFICE 2,420,878

LOSS-OF-LOAD RELAYING

Shirley L. Goldsborough, Basking Ridge, and Harvey P. Sleeper, Short Hills, N. J., assignors to Westinghouse Electric Corporation, East Pittsburgh, Pa., a corporation of Pennsylvania Application April 20, 1944, Serial No. 531,852

23 Claims. (Cl. 175—294)

The present invention relates to a new method and means for quickly discriminating between internal and external faults which may be located anywhere within the limits of a protected polyphase line-section, by means of relaying indications which are obtained altogether at the relaying point, without any communicating channel between the relaying point and the other terminal of the protected line-section.

The invention utilizes any kind of fault-detectors whereby certain faults involving less than all of the phases of a polyphase line-section may normally be reliably detected more quickly at one end than at the other end of the protected section. In one form of embodiment, the invention makes use of any known or suitable first-zone distance-responsive relaying-means for responding correctly to faults, on the protected line-section, which are not too close to the remote terminal of the section, and it utilizes this first-zone relaying-means to effect a circuit-opening or tripping operation of all of the poles or phases of a polyphase line-segregating circuit-breaker or circuit-interrupting means at the terminal where these relays are provided. This part is old, and it presents no problems as long as the fault is not too close to the remote terminal of the protected section.

Almost all faults on a transmission line start out as faults which involve less than all of the phases of the line. In faults involving sequential breaker-operation, all phases of the circuit-breaker at one end of the faulted line-section will be opened first, in response to a first-acting relaying-means. The adjoining sound sections will generally be carrying a power-load at the time of fault. If one of the adjoining sound sections should not be carrying any sensible load, an unnecessary breaker-tripping and reclosing operation in that section would frequently not be objectionable, or provision may be made for avoiding it, according to our invention.

The present invention, therefore, makes use of relays, at each end of each line-section, for responding to a loss of load on an unfaulted line-conductor or phase, in combination with auxiliary fault-detectors, such as second- or third-zone relaying-means, which operate in a shorter time than would normally be required to discriminate between faults on the near and far sides of the remote line-terminal, so that loss of load is utilized to effect the proper discrimination The objects of the invention are to provide a loss-of-load relaying system of the type just described, with such safeguards and refinements as are hereinafter more particularly described and claimed, and illustrated in the accompanying drawing, wherein:

Figure 1:
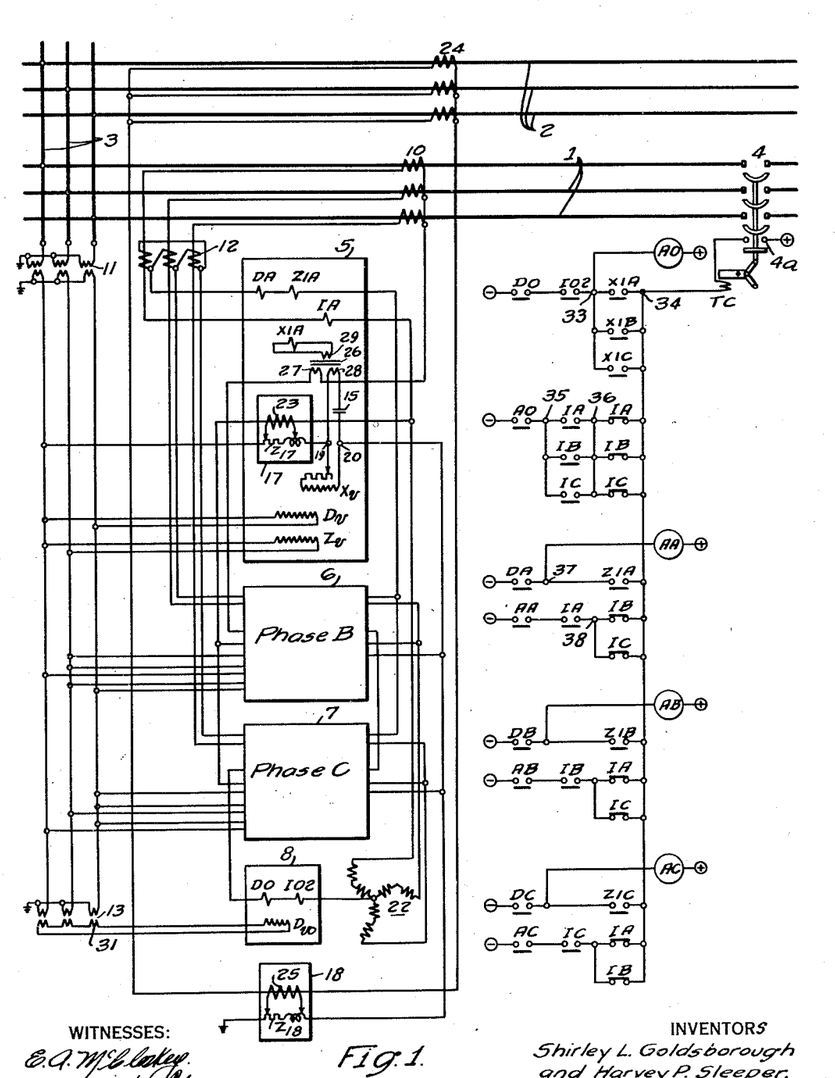
Figure 1 is a diagrammatic view of circuits and apparatus embodying the invention in a preferred form of embodiment.

Fig. 1 illustrates one terminal of a protected three-phase line-section 1, which is a part of a 60-cycle transmission line or system which includes a parallel line-section 2, the two line-sections being connected to a bus 3 at the illustrated terminal. The protected line-section 1 is provided with a three-phase line-segregating circuit-breaker 4, which is illustrated as having an auxiliary make-switch 4a, and having a trip-coil TC. Since the protective equipments at both terminals of the protected line-section 1 are, or may be, identical, an illustration and description of one terminal equipment will suffice.

The protective relaying equipment, as illustrated in Fig. 1, comprises phase-relays 5, 6 and 7, for the three phases A, B and C of the line, and ground-relays 8. Since the three phase-relays 5, 6 and 7 are similar, a detailed illustration and description of the phase-A relays 5 will suffice for all three.

Line-responsive relaying currents and voltages are provided by means of line-current transformers 10 and potential transformers 11, in conjunction with auxiliary current-transformers 12 and auxiliary potential transformers 13.

The relaying equipment is illustrated as comprising four directionally responsive elements D, which are distinguished by the additional letters A, B, C and O for distinguishing between the three line-phases A, B and C and the zero-sequence currents and voltages, respectively. The relaying system which is illustrated in Fig. 1 further comprises first-zone phase-fault distance-responsive elements which are illustrated as impedance-elements Z1A, Z1B and Z1C, for the three phases, and first-zone ground-fault distance-responsive elements which are illustrated as compensated reactance relays X1A, X1B and X1C, for responding to ground-faults on the respective line-phases. The illustrated relaying system, in Fig. 1, also includes a second-zone residual overcurrent relay IO2, the designation second-zone here indicating a relay which responds to ground-faults more sensitively than the first-zone elements, and with sufficient sensitivity to respond to faults which may lie beyond the remote terminal of the protected line-section.

In accordance with the present invention, the several phase-fault relaying elements or panels 5, 6 and 7 also include some sort of load-responsive relaying-means, which are responsive to the power-loads on the respective line-conductors, and which are illustrated in the form of line-current-responsive relays IA, IB, and IC, respectively.

The operating coils and the contacts of the various relays are designated by the letters which constitute the relay-designation, so that the relay-designation is sufficient to indicate both the operating-coils and the contacts of the various relays, the relays being illustrated in their unenergized positions.

In Fig. 1, the phase-A direction element DA is provided with an operating coil DA which is energized from the auxiliary current-transformers 12 so as to be excited in response to the difference between the phase-A and phase-B line-currents $I_A-I_B$, or the delta-current $I_{AB}$. The directional element DA is also provided with a voltage-responsive polarizing coil $D_V$, which is energized from the potential-transformer 11 so as to be responsive to the delta line-voltage $E_{AC}$. The operating coil of the first-zone impedance relay Z1A is energized in series with the DA coil, so as to be likewise responsive to the delta line-current $I_{AB}$, and this impedance relay is provided with a voltage-responsive restraint-coil $Z_V$, which is energized in response to the delta line-voltage $E_{AB}$.

In Fig. 1, it is desirable that the phase-fault directional elements, such as the element DA, shall be discriminatorily responsive to fault-conditions, as distinguished from normal power-load conditions, and to this end, the DA relay is designed so as to respond to the inflowing fault-currents, which flow into the protected line-section in the event of an internal fault within said line-section, without responding, in general, to power-currents. An exemplary form of such a directional element would be a voltage-restrained element, in which a restraining torque is provided by a voltage-energized coil which may be included in the voltage-restraining windings which are indicated generically at $Z_V$, being responsive to the delta line-voltage $E_{AB}$.

In Fig. 1, the phase-A load-responsive relay IA has a single operating coil IA, which is energized from the line-current transformer 10, so as to be responsive to the line-current $I_A$.

The compensated ground-fault reactance-relays, such as the element X1A in Fig. 1, may be any suitable type of reactance-relay, having an operating winding or coil X1A, and a restraint-winding $X_V$. Any suitable type of reactance relay may be utilized, for responding to the reactive component of the line-impedance up to the fault on the transmission line. Several such relays are known. The illustrated reactance relay is similar to one which is shown in the Lewis Patent 1,967,093 of July 17, 1934. Other available types of reactance relays are described and claimed in an application of S. L. Goldsborough, Serial No. 504,695, filed October 2, 1943. The illustrated form of reactance relay is so excited as to have an operating force which is responsive to the vectorial sum of current and voltage, with a suitable dephasing means which is illustrated in the form of a capacitor 15 which is connected in series with the voltage-responsive energizing-current, and the relay has a restraint which is responsive to voltage alone.

In order that the reactance relay X1A may be utilized to provide an accurate response to the distance of a ground-fault from the relaying point, it is a compensated relay, as described in the Lewis Patent 1,897,022 of February 7, 1933. The particular relay illustrated utilizes zero-sequence current-response, with voltage-compensation, utilizing a voltage-response to the relaying voltage $$E_A - nZ_1(I_A - I_0) - nM_0 I_{0m}$$

where $E_A$ is the phase-A star-voltage of the line, $Z_1$ is the positive-sequence impedance of the protected line-section, $M_0$ is the zero-sequence mutual impedance between the two parallel line-sections 1 and 2, $n$ is the proportion of the length of the protected line-section up to the balance-point of the relay X1A, $I_A$ is the phase-A line-current, $I_0$ is the zero-sequence line-current in the protected line-section, and $I_{0m}$ is the zero-sequence current in the mutually coupled parallel line-section 2.

The first term of the relaying voltage is obtained, in Fig. 1, from the potential transformer 11; the second term from a compensator 17, and the third term from a compensator 18, the resultant relaying voltages being applied between the points 19 and 20. The first compensator 17 is excited by the current $(I_A - I_0)$, which is obtained by subtracting the zero-sequence component from the line-current $I_A$ by means of a shunt-connected grounding transformer, such as an interconnected-star transformer-bank 22. The resultant current is applied, through an auxiliary current-transformer 23, to a suitable impedance $Z_{17}$, in the compensator 17. The second compensator 18 is energized from the zero-sequence component of the current in the mutually coupled, parallel-connected line 2, through a line-current transformer 24, and an auxiliary current-transformer 25 which feeds current into the impedance $Z_{18}$ of the compensator 18.

The algebraic or vectorial summation of the current and voltage-responsive exciting currents on the operating-side of the reactance relay X1A in Fig. 1 is illustrated as being effected by means of an auxiliary transformer 26, having two primary windings 27 and 28, which are energized responsively to current and voltage respectively, and a secondary winding 29 which supplies the exciting current to the operating coil X1A of the relay, as shown in Fig. 1.

The ground-fault relaying panel 8 includes the operating coils of the ground-directional relay DO and the ground-overcurrent relay IO2, which are energized by the residual current of the line-current transformers 10. In addition, the directional element DO has a voltage-responsive polarizing winding $D_{V0}$, which is excited responsively to the zero-sequence line-voltage which is obtained from the open-delta secondary winding 31 of the auxiliary potential transformers 13, which are in turn energized from the potential transformers 11.

In Fig. 1, the tripping circuits of the circuit-breaker 4 are indicated, in across-the-line diagram, from the negative relaying bus (−) to the positive relaying bus (+).

A first ground-fault tripping-circuit 33—34 is traceable in Fig. 1 from the negative bus (−), through the ground-current directional-relay contact DO and the ground-overcurrent relay-contact IO2, to a conductor 33; thence through any one of the three parallel-connected reactance-relay contacts X1A, X1B and X1C, to the tripping bus or conductor 34, from whence the trip-circuit is completed through the trip-coil TC and the auxiliary breaker-switch 4a to the positive bus (+). The conductor 33 is also utilized to energize the operating coil of an auxiliary ground-fault relay AO.

A second ground-fault tripping-circuit 35—36 is traceable in Fig. 1 from the negative bus (—), through the ground-fault auxiliary-relay contact AO, to a conductor 35, from which a circuit is completed, through any one of three parallel-connected make-contacts of the load-responsive overcurrent relays IA, IB and IC to a conductor 36, from which the circuit continues, through any one of the three parallel-connected back-contacts of the same overcurrent relays IA, IB and IC, to the tripping-bus 34.

The phase-fault tripping-circuits of Fig. 1 may be properly indicated by tracing out the connections for only one of the phases, such as the phase A. As shown in Fig. 1, a first phase-fault tripping-circuit 37 is traceable from the negative bus (—), through the directional-contact DA, to a conductor 37, and thence through the first-zone impedance-relay contact ZIA to the tripping bus 34. The conductor 37 is also utilized to energize a phase-A auxiliary relay AA.

A second phase-A tripping-circuit 38 is provided, from the negative bus (—), through the auxiliary-relay contact AA and a make-contact of the overcurrent relay IA, to a conductor 38, from which the circuit continues, through either one of two parallel-connected back-contacts of the overcurrent relays IB and IC, to the tripping bus 34.

All of the tripping circuits shows in Fig. 1 are instantaneous or quick-acting tripping-circuits, except that, if the ground-fault relays DO and IO2 are such that they are likely to pick up, during the initial breaker-closing operation for energizing the protected line-section, between the time when the first pole of the breaker closes and the closing-instants of the second or third poles of the breaker, then it may be desirable to choose an auxiliary ground-fault relay AO which does not close its contacts too quickly, requiring a slight time-hesitation of something like one-half of a cycle, more or less, to close its contact, so that this ground-fault auxiliary relay AO will not pick up under such circumstances. The same time-hesitation may also be embodied in the phase-fault auxiliary relays AA, AB and AC, if it should be necessary for this reason, or for any other time-coordination with other relays; but this provision is not in general necessary, because the phase-fault relays are not in general as sensitive as the ground-fault relays, and hence not as likely to give trouble by operating prematurely during the time necessary for the respective poles of the circuit breakers to close, when the line is being energized.

Figure 2:
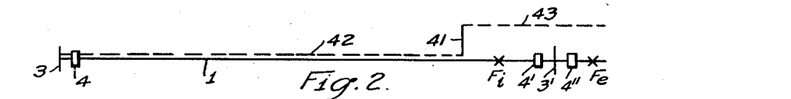
Fig. 2 is a time-distance diagram illustrating the well-known difference between first- and second-zone relaying elements with respect to internal and external faults which are located close to the remote line-terminal of the protected section, either on the near side of said terminal or on the far side thereof.

Reference to Fig. 2 will make clearer the operation of the system. It is assumed that the bus 3 at the relaying terminal is at the left-hand end of Fig. 2, the protected line-section being illustrated, in single-line diagram at I in Fig. 2, and the circuit-breaker which is illustrated in Fig. 1, at the relaying terminal, being indicated diagrammatically at 4 in Fig. 2. The far-end bus is indicated at 3' in Fig. 2, and the balance-point of the first-zone distance-responsive relays is indicated at 41, this point being removed from the relaying-terminal 3 by a distance which is a fraction of the distance between the two terminals 3 and 3'. The far-end circuit-breaker within the protected line-section is indicated diagrammatically at 4' in Fig. 2, while the far-end circuit-breaker which is beyond, or outside of, the protected line-section is indicated diagrammatically at 4'' in Fig. 2. The discussion of the operation will be directed more particularly to a fault close to the far-end terminal 3', but on either side of it, that is, either an internal fault Fi on the near side of the far-end terminal 3', or an external fault Fe on the far side thereof.

The first dotted line 42, in Fig. 2, indicates the instantaneous protective-zone which is reached by the first-zone distance-responsive relays such as XIA and ZIA (assuming phase-A faults). The second dotted line 43 in Fig. 2 indicates the second-zone response-area, which is usually taken care of by time-delayed backup-relay protective devices, which are not shown as they may be standard equipment. According to the present invention, it is possible to extend the instantaneous, or substantially instantaneous, tripping-zone 42 from the first-zone balance-point 41 to the far end 3' of the protective line-section, and this is accomplished without resorting to any kind of communicating channel between the remote-terminal 3' and the relaying terminal 3.

In Fig. 1, the illustrated tripping circuits are only those which might be called the quick-tripping circuits, no effort being made to illustrate the time-delayed or back-up protection which is usually provided, in most protective relaying systems, and which may be also utilized with the present invention.

The joint response of the ground-fault directional element DO and the second-zone ground-fault overcurrent element IO2 results in a response to both the direction of the ground-fault current and the intensity or magnitude of the fault itself, the latter response being desirable in cases where the directional element DO is so sensitive that it is susceptible of improper responses to "stray" or apparent ground-currents which result from imperfect matching of current-transformers or from any other cause. This directional ground-fault response, which is utilized for the energization of the conductor 33 in Fig. 1, is not a response which is capable of distinguishing between faults which are closer than, or farther away than, the far-end terminal of the protected line-section I, and hence it is not feasible to trip the circuit-breaker 4 in response to an energization of this ground-fault-directional conductor 33.

According to the present invention, however, advantage is taken of the fact that it is perfectly feasible to set the distance-responsive ground-fault detectors or relays XIA, XIB and XIC so that they will reliably respond whenever a ground-fault, on their particular phase, occurs anywhere within the protected line-section except near the extreme remote end thereof. Instantaneous tripping is obtained, in an ordinary manner, in response to a joint response of the directional ground-response and the distance ground-response.

For the few cases in which the ground-fault is too far away for the first-zone elements XIA, XIB and XIC to respond, our invention provides a discriminatory response by means of the load-responsive overcurrent relays IA, IB and IC, which are utilized in the second ground-fault tripping-circuit of Fig. 1.

When the ground-fault directional conductor 33 is energized, indicating the presence of a ground-fault, not necessarily within the confines of the protected line-section, but accompanied by a current-direction such as to indicate that the fault is either within the protected section or beyond the far terminal thereof, the second auxiliary conductor 35 is energized, which may be accomplished either by a direct connection to the conductor 33, or through the intermediary of the slight time-hesitation which is provided by the auxiliary ground-fault relay AO.

The operation of this second ground-fault tripping-circuit is as follows. Ordinarily, when there is no fault, the three overcurrent relays IA, IB and IC are energized by load, so that their make-contacts are closed and their break- or back-contacts are open.

Let us now assume that a fault has occurred, causing one of the circuit-breakers 4' or 4" (Fig. 2) to open at the far end of the protected line-section, but that we do not yet know whether the tripped circuit-breaker is on the near side or the far side of the remote-end terminal 3' of the protected line-section. It will be evident that if the actuated circuit-breaker is beyond the bus 3' at the far end of the protected line-section, as shown at 4" in Fig. 2, the fault-current will be cut off from the overcurrent relays IA, IB, IC, at the relaying station which is illustrated, and hence, if there is no local load on the remote-end bus 3', all three of the overcurrent relays IA, IB and IC will drop out, so that the trip-circuit conductor 36 of Fig. 1 will not be energized.

On the contrary, if the remote-end circuit-breaker, which trips as a result of a ground-fault too far away for the first-zone ground fault detector X1A, X1B and X1C to respond to, is on the near side of the remote-end bus, that is, if the tripped circuit-breaker is within the protected line-section 1, as shown at 4' in Fig. 2, then that means that the fault is somewhere within the protected line-section, so that the fault-current will still be flowing, at the relaying station which is illustrated in Fig. 1, in the faulted phase-conductor. Therefore, one of the three load-responsive overcurrent relays IA, IB or IC will remain energized, thus keeping the trip-circuit conductor 36 energized from the conductor 35. At the same time, the other two overcurrent relays, such as IB and IC, assuming a phase-A fault, will drop out, because of loss of power-loads on these two sound line-conductors, thereby completing a tripping circuit from the auxiliary conductor 36 to the tripping bus 34 in Fig. 1.

The foregoing explanation has assumed that there is no local load on the far-end bus 3'. If, however, there is a local load on said far-end bus, if the circuit-breaker beyond said bus should open, in response to a ground-fault which is beyond said far-end bus, the power-load will not be lost on the three overcurrent relays IA, IB and IC at the relaying point which is being considered, and hence all three of these overcurrent relays will remain energized, resulting in no tripping operation, because a tripping operation is obtained only when one or more of said overcurrent relays drop out, while one or more of the others remain energized.

The phase-fault tripping-control in Fig. 1 operates similarly to the ground-fault control, except that phase-fault detector-relays are utilized. As a variation which may be adopted in the loss-of-load relay-contacts of the overcurrent relays IA, IB and IC, a simplified connection is shown in the second phase-fault tripping-circuit 38 of Fig. 1, although it is to be understood that the same elaborate loss-of-load connections could have been utilized, as have already been described in the second ground-fault tripping-circuit utilizing the auxiliary conductor 35 of Fig. 1.

In the second phase-fault tripping-circuit 38 of Fig. 1, if there is a phase-A fault, for example, beyond the far-end bus 3', resulting in the tripping of a circuit-breaker 4" beyond said far-end bus, all three of the over-current relays IA, IB and IC will drop out, for loss of fault-current or load-current as the case may be, if there is no sensible local load on the far-end bus, and all three will remain actuated if there is a sensible load on the far-end bus, so that loss-of-load tripping will not be obtained in either case. However, if the phase-A fault is an internal fault, or on the near side of the far-end bus 3', the opening of the circuit-breaker 4' on the near side of the far-end bus 3' will result in a loss of load on one or the other of the phase-B or phase-C overcurrent relays IB and IC at the relaying point which is illustrated in Fig. 1, so that one of these relays will drop out and complete a circuit between the auxiliary conductor 38 and the tripping conductor 34. At the same time, the overcurrent relay IA in the faulted phase A will remain energized, because of the fault-current flowing in this conductor, causing the second phase-A tripping circuit 38 to be energized up to the point 38 in Fig. 1, and thence on through to the tripping-bus 34.

In the foregoing explanations, when reference has been made to a load on the far-end bus 3', it has been contemplated that load-current was flowing either to or from said far-end bus, through the protected line-section 1.

The invention is susceptible of being embodied in a number of different ways.

Figure 3:
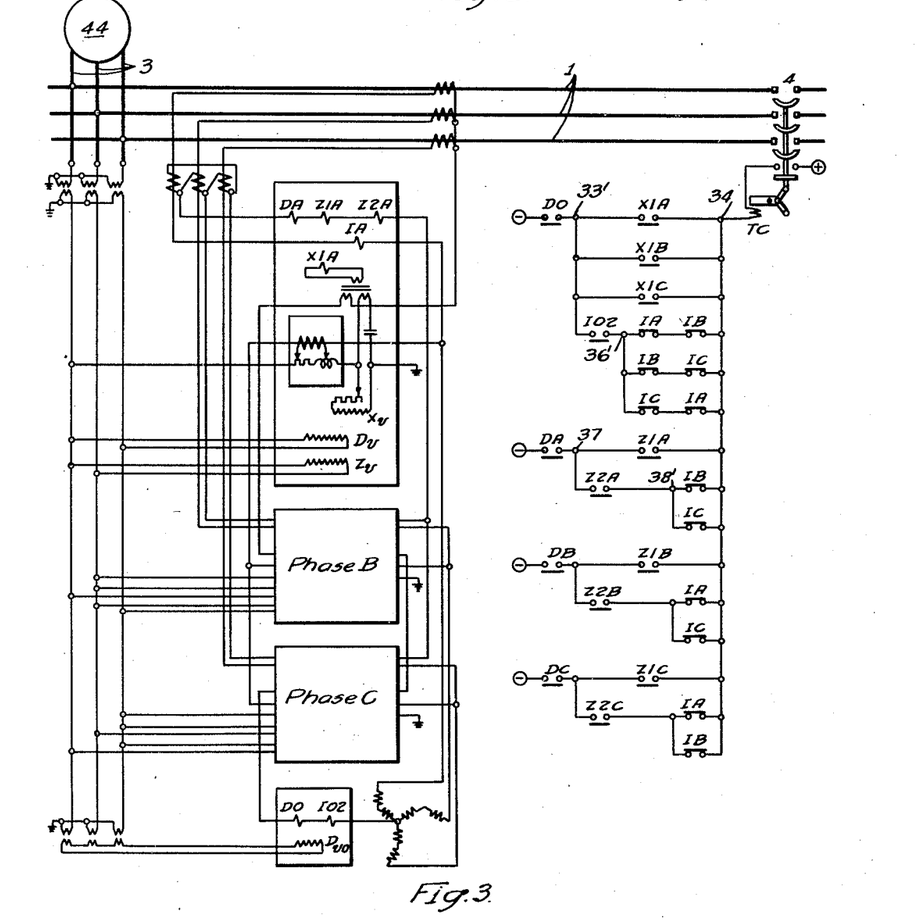
Fig. 3 is a diagrammatic view of circuits and apparatus illustrating an alternative form of embodiment of the invention.

In Fig. 3, for example, the second-zone ground-fault detector-contact IO2 is not utilized in the first ground-fault tripping-circuit 33', but the ground-fault directional-relay contact DO is utilized to directly energize an auxiliary conductor 33', from which the tripping circuit extends, through any one of the three parallel-connected contacts X1A, X1B and X1C, to the tripping conductor 34.

The second ground-fault tripping-circuit 36', in Fig. 3, is extended from the directionally energized conductor 33', through the sensitive ground-fault detector-contact IO2, thence to the conductor 36', and from this point on, the circuit is changed somewhat, so that it requires the dropping out of any two of the three load-responsive overcurrent relays IA, IB and IC, in order to connect the tripping bus 34 to the auxiliary conductor 36'. This makes sure that the second ground-fault tripping circuit shall not be operated except in case of a single-phase ground-fault, leaving the phase-fault relays to take care of ground-faults involving more than one of the line-conductors.

In Fig. 3, also, it is assumed that a suitable three-phase source or load 44 is connected to each of the busses 3, 3', etc., at the various line-section terminals, so that there will always be a power-load current being exchanged, in one direction or the other, over the protected line-section 1, except of course when this line-section is taken out of service by a line-sectionalizing opening-operation of one of its circuit-breakers 4, 4', etc., at one terminal or the other.

In Fig. 3, in place of the make-contacts of the overload relays IA, IB and IC, which are described for the phase-fault tripping-circuits 38 in Fig. 1, a second-zone distance-type phase-fault relay is provided for each phase, as indicated at Z2A, Z2B and Z2C. The operating coils of these relays, for example the phase-A second-zone impedance element Z2A, are energized in series with the operating coils of the first-zone elements such as Z1A, and the voltage-responsive restraining coils are included in the voltage-responsive windings which are marked $Z_v$.

In Fig. 3, the make-contact of the second-zone impedance-element, such as Z2A, is utilized in the second phase-fault tripping-circuit, which is traceable from the conductor 37, through the make-contact Z2A, to the conductor 38', from which point on, this tripping circuit is as described in connection with Fig. 1.

The second-zone distance-element Z2A performs the same function, in the phase-fault loss-of-load tripping-circuits 38', as the second-zone ground-fault element 102 in the ground-fault loss-of-load tripping-circuit 36'. In either case, the second-zone element, coupled with its corresponding directional element, can ascertain that there is a fault, either at a location such as $F_i$ or $F_e$ in Fig. 2, without more precise discrimination as to the exact location of the fault with respect to the remote terminal of the protected line-section, and the loss-of-load relays IA, IB and IC, or any suitable combinations thereof, serve to afford the needed discrimination to enable the relaying system to trip the circuit-breaker 4 in response to an internal fault, such as a fault $F_i$ in Fig. 2, but not in response to an external fault such as $F_e$.

In Fig. 3, since the phase-fault directional relay DA is at all times supervised by, or used in conjunction with, either the first-zone distance-relay contacts Z1A or the second-zone distance-relay contacts Z2A, it is not necessary to utilize the voltage-restraint, which was suggested, in Fig. 1, in an effort to approximate the combined response to direction and second-zone distance, all in a single directional element DA.

In case the phase-fault relay DA, in Fig. 1, or the phase-fault relays DA and Z2A in Fig. 3, are such as to respond only to faults involving phase A, or to two-phase faults involving phases A and B, but not to two-phase faults involving phases A and C, and in case the ground-fault relaying-means are provided, for taking care of single line-to-ground faults involving only phase A (for example), then the back-contact IB may be omitted, between the conductors 38 and 34 in Fig. 1, and between the conductors 38' and 34 in Fig. 3, as will readily be understood, so that the loss-of-load phase-fault tripping-operation will be effected only in the event of a loss-of-load indication on the phase-C line-conductor.

The specific forms of embodiment of our invention, thus far shown and described, in connection with Figs 1 to 3, permit the tripping of line-sections which were not carrying load-current upon the occurrence of external faults. While ordinarily this is not disadvantageous, it sometimes happens that a line-section which does not transmit load previous to an external fault may be called upon to pass load-current the moment an external fault in some other line-section is cleared.

The previously described forms of embodiment of our invention, as illustrated in Figs. 1 to 3, also utilize a form of relaying equipment in which, at times, the relays at one end of a faulted line-section can be relied upon to respond and trip the breaker more promptly than at the other end, so that our loss-of-load relaying equipment may then step into the picture, and cut down any further time-delays after the first breaker opens, at the first end of the line-section, and accomplish this without any pilot-wires, or carrier-current, or any other kind of communication between the two ends of the line-section. This first-acting fault-responsive relaying-means does not need to be a distance-responsive relaying-means, as specifically shown in Figs 1 and 3, but it may be regarded as typical of any relaying-apparatus which reliably responds more quickly at one end, than the other, as in a conventional directional overload relaying equipment on a ring or loop-system, in which the time-setting of each successive relay must be increased by an amount sufficient to allow time for the circuit-breaker in the preceding substation to open.

Figure 4:
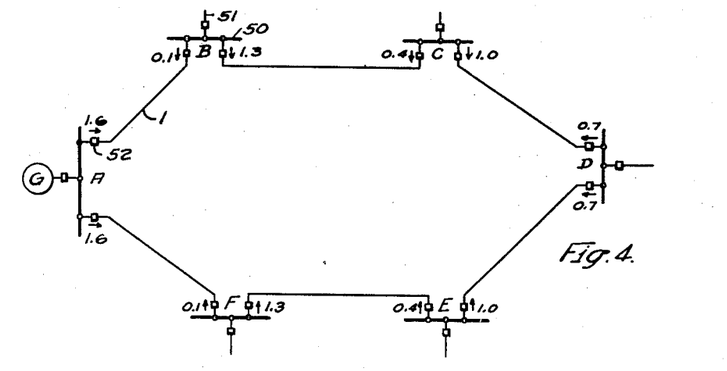
Fig. 4 is a single-line diagram of a loop-circuit to which our invention is applicable.

Fig. 4 shows a typical directional overcurrent loop-system in single-line diagram, with the principal generating bus or substation indicated at A, the generator being indicated at G, and with a plurality of other substations indicated at B, C, D, E and F, each substation comprising a bus 50 and one or more feeders 51, which may be connected to loads, generators, or combinations of loads and generators. The successive stations are connected together, in loop fashion, by a three-phase transmission-line 1, which is symbolically indicated by means of a single line in Fig. 4. The circuit-breaker and relay equipment at each end of each line-section is conventionally indicated by means of a rectangle, with the addition of an arrow to indicate the direction of current-response, and a figure to indicate the relay time-setting in seconds.

Figure 5:
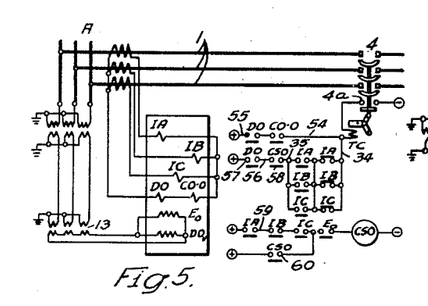
Figs. 5, 6 and 7 are diagrammatic views, similar to Figs. 1 and 3, illustrating alternative forms of embodiment.
Figure 6:
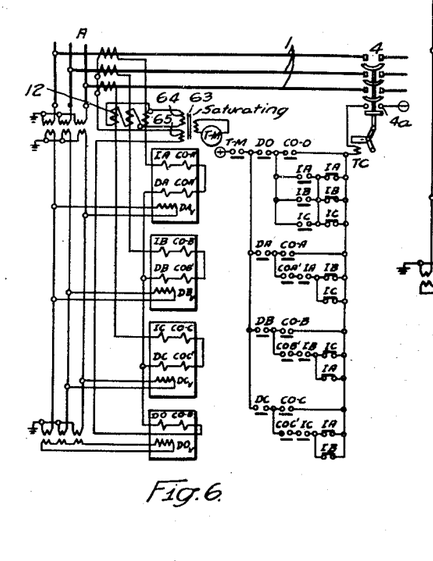
Figure 7:
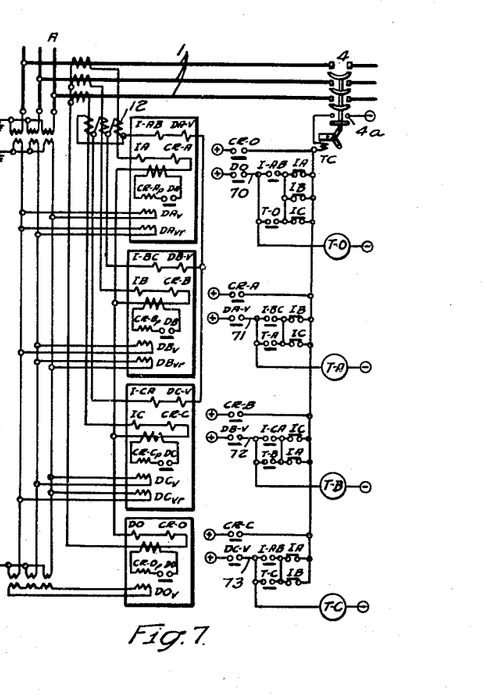

Figs. 5, 6 and 7 show illustrative ways in which our invention can be applied to such a directional overcurrent loop-system, at any bus or station-terminal, such as A, where the relay time-setting is longer than at the other end of that section of the transmission-line or loop. In this maner, we are able to reliably effect a tripping-operation at the line-end having the longer time-setting, by responding to a loss of load to make possible a tripping-operation without waiting for the expiration of the entire, long time-setting.

The loop-system shown in Fig. 4 is also typical of a type of transmission-system in which one, or more, or all, of the line-sections are what are called "floater" lines, or line-sections in which the load may fluctuate over wide limits, sometimes in one direction, and sometimes in the other, and may be actually zero, or substantially zero, for appreciable lengths of time. If a fault should occur in some other section of the loop-system, while such a "floater" section is carrying no load-current, as soon as the first breaker opens, in the faulted section, the loop-circuit will be broken, so that the "floater" section will usually immediately be called upon to carry current, and it will be obviously undesirable to permit such a "floater" section to have a breaker-opening operation, even though that operation should be immediately followed by a breaker-reclosing operation. It may also be desirable, in some transmission-systems other than loop-systems, to sometimes prevent a breaker opening and reclosing operation in fault-free line-sections, even though there is no sensible load on said line-section immediately preceding the occurrence of a fault on some other line-section of the transmission-system.

Figs. 5, 6 and 7 show various forms of embodiment of means whereby, if a line-section, protected by our loss-of-load relaying-apparatus, is not carrying sensible load-current immediately before the occurrence of a fault, either internal or external, a brief time-delay will be interposed before our loss-of-load relaying-apparatus will be permitted to trip the breaker at that end of the line-section, in order to afford time to determine whether that line-section is going to be called upon to carry current as a result of the clearing of the fault in some other line-section. If, however, the line-section in question was carrying current immediately preceding the fault-condition, then the equipment illustrated in Figs. 5, 6 and 7 in general permits the loss-of-load relaying apparatus to function promptly, without interposing said time-delay, or the loss-of-load function may be locked out, if there is no load on the protected line-section at the time of occurrence of the fault.

In the form of invention shown in Fig. 5, it is assumed that our loss-of-load relaying-equipment is associated only with the ground-fault protective-relays of a directional overcurrent relaying system including a ground-fault directional element DO, and a ground-fault overcurrent element CO—O having a predetermined time-setting such as indicated in Fig. 4. The operating coils and the contacts of the relays are designated by the same designations, while the polarizing coil or voltage-coil of the directional element DO is indicated at $DO_v$, being energized from an auxiliary zero-sequence potential-transformer 13, as indicated. In Fig. 5 we utilize, as previously described, load-responsive overcurrent relays IA, IB and IC. We also utilize a zero-sequence voltage-relay $E_0$, as an auxiliary ground-fault detector. We also utilize an auxiliary ground-fault relay or contactor-switch CSO, which instantly closes its contacts CSO.

Of the tripping-circuits shown in Fig. 5, the first tripping-circuit 54 is the conventional directional overcurrent tripping-circuit which is illustrated as comprising a directional DO-contact 55 and the overcurrent contact CO—O. A second tripping-circuit 56 is also shown, in Fig. 5, which may be traced from the positive bus (+) through a directional DO-contact 57 and a contact 58 of the auxiliary relay CSO, to a circuit-point 35, from which a circuit is completed to the tripping-bus 34, through a group of loss-of-load relaying-contacts IA, IB, IC, such as is shown in Fig. 1, and already described. The operating coil CSO of the auxiliary relay CSO is energized in a circuit 59 containing three serially connected make-contacts of the three overcurrent relays IA, IB and IC, shunted by a holding-circuit comprising a CSO-contact 60, and connected also in series with the zero-sequence voltage-responsive contact $E_0$.

In the operation of the system shown in Fig. 5, the loss-of-load tripping-operation is not effected, through the tripping-circuit 56, unless and until the CSO-contact 58 closes. If the line-section in question was carrying load-current immediately before the occurrence of current of fault-magnitude, the three serially connected overcurrent contacts IA, IB and IC in the CSO-energizing circuit 59 will be closed, so that the CSO-relay will be energized immediately upon the response of the auxiliary ground-fault detector $E_0$ to the appearance of a zero-sequence voltage-component in the line-voltage. In order that there shall be no unnecessary time-delay, the auxiliary relay CSO is of a type which is as fast as possible in its operation. Therefore, as soon as the circuit breaker opens at the other end of the line-section, (assuming that said remote-end breaker opens first), one or two of the loss-of-load overcurrent-relays IA, IB and IC will drop out, in the sound phase or phases, completing the loss-of-load tripping-circuit between the conductors 35 and 34.

In the event, however, that the protected line-section was not carrying sensible load-current immediately previous to the fault in Fig. 5, the loss-of-load tripping-circuit 56 will be interrupted at the CSO-contact 58, which remains open until the transmission-line circuit-conditions so change that load is carried by all three of the line-conductors of the line-section in question, as a result of a switching-operation in some other line-section of the system, thereby requiring all three of the overcurrent relays IA, IB and IC relays to be picked up, before the CSO-relay is energized, so that there can be no loss-of-load tripping-operation in response to an external fault.

The particular system shown in Fig. 5 thus entirely locks out the loss-of-load relaying-feature, in the event that an internal fault, involving less than all three of the line-conductors, occurs on the protected line-section at a time when it was not previously carrying a polyphase load-current of sufficient magnitude to pick up all three of the load-responsive overcurrent relays IA, IB and IC. In such an event, the protective apparatus operates just as if our loss-of-load relaying equipment were not present.

In Fig. 6, is shown a different form of embodiment of our loss-of-load relaying, as applied to a "floater" line-section which is to be controlled in response to the loss-of-load equipment whether the line was loaded or unloaded immediately previous to the occurrence of the fault, but which interposes a time-delay in case the line-section was unloaded prior to the fault, interposing no time-delay in the event that the line section was loaded prior to the fault.

In Fig. 6, we utilize a timer T-M, which is set into operation, both in response to load-current, and in response to fault-current. When the timer T-M responds, it closes its contact T-M at the end of the time-setting for which it is set, and it thereafter holds said contact closed, without further movement of the timer, if the timer continues to remain energized thereafter. We utilize this timer-contact T-M in series with all of the tripping circuits, or at least in series with the loss-of-load relaying-circuits. If the protected line-section was carrying load, prior to the occurrence of a fault, either an internal fault or an external fault, the timer-contact T-M will be already closed, before the fault occurs, and the relaying operation will continue just as if the timer-contact T-M had not been present. If, however, the line-section in question had not been carrying load-current prior to a fault, then the timer-contact T-M will be open, and it will not close until the expiration of its predetermined time-setting after the occurrence of the fault, whether that fault is internal or external.

The time-setting of the timer T-M is necessarily longer than the time which would be required for a "floater" line-section to become loaded as a result of breaker-operations in some other line-section. Usually, load will appear, in a previously unloaded "floater" line-section, immediately upon the tripping of the first breaker which opens in some other line-section which is faulted, and in such cases, the time-delay of the timer T-M need be only one breaker-tripping time, plus the relay-time, plus whatever factor of safety is allowed. In a system, however, in which load will not appear on a previously unloaded "floater" line-section until after the external fault is completely cleared, then the time-setting of the timer T-M will have to correspond to two breaker-times, plus the relay-time, and any desirable factor of safety.

The particular system illustrated in Fig. 6 is illustrated in connection with a directional overcurrent relaying-system, with the addition of loss-of-load relaying, and the addition of the timer T-M just mentioned. We desire it to be understood, however, that the timer T-M, or its equivalent, is applicable to any relaying system embodying our loss-of-load relaying-principle, whether involving directional overcurrent relays or directional distance-responsive relays.

In Fig. 6, the operating coil T-M of the timer T-M is energized from a saturating transformer 63, having two primary windings 64 and 65. The primary winding 64 is energized in response to a delta line-current, derived from an auxiliary delta-connected current-transformer 12, so that this winding causes the timer T-M to be energized, both in response to load-current and in response to phase-fault current. The second primary winding 65 is responsive to the residual line-current, so as to be responsive to ground-faults. While we have thus illustrated a simple timer-energizing means, for energizing the timer T-M both in response to load-currents and in response to any kind of fault-currents, we wish it to be understood that we are not limited to the particular illustrated means, which will interpose a time-delay in case neither load-current nor fault-current existed prior to the occurrence of a fault somewhere on the transmission system, and which will interpose no time-delay in the event that a load-current was present on the protected line-section prior to the occurrence of the fault-condition.

In the particular system illustrated in Fig. 6, we have shown a directional overcurrent system having ground and phase-fault directional elements DO, DA, DB and DC, and slow-acting overcurrent-elements CO—O, CO—A, CO—B, CO—C, corresponding to the equipment such as would ordinarily be utilized on a loop-system such as is shown in Fig. 4. In addition, we utilize auxiliary phase-fault overcurrent-elements COA', COB' and COC', which have a minimum time-setting, the time-delay in their action being as small as possible so long as the time of response of said auxiliary overcurrent elements COA' COB' and COC' is longer than the reset-times of the overload elements IA, IB and IC. We utilize the contacts of these quickly-acting auxiliary over-current fault-detectors COA', COB' and COC' in the same manner as the contacts of the second-zone distance-elements Z2A, Z2B, and Z2C in Fig. 3.

The operating-coils of the relays shown in Fig. 6 are designated by the same designations as the respective relay-contacts. The polarizing coils or voltage-coils of the various directional elements DA, DB, DC and DO are indicated at $DA_v$, $DB_v$, $DC_v$, $DO_v$, respectively.

It is believed that the various tripping-circuits of Fig. 6 need no more explanation, in view of the previous discussion of the tripping-circuits in Figs. 1 and 3, and in view of the discussion already given in regard to the effect of the added timer-contact T-M in Fig. 6.

In Fig. 7, we show a somewhat different form of embodiment of our invention, in which the timer-contact is connected only in the loss-of-load tripping-circuit, and not in the tripping-circuit which is independent of loss of load, and the timer-contact is shunted by a load-responsive contact which is responsive to load-conditions but not to fault-conditions. Thus, if load was present, on the line-section, before the fault-condition occurred, then the auxiliary tripping-circuits which are supervised by a response to a loss of load will be completed without waiting for the time-delay interposed by the timer-element, but if the load did not exist, prior to the fault, then the timer interposes a time-delay sufficient to distinguish between internal and external faults, by waiting until there has been time for load to appear in the protected line-section, if it is going to appear, as a result of the opening of the external circuit-breaker.

In Fig. 7, instead of utilizing directional elements supervised by fault-responsive elements, having contacts in the phase-fault loss-of-load tripping-circuits, we utilize directional elements which are designed so that they do not respond under load-conditions, but respond only under fault-conditions. The ground-fault directional element DO, being a zero-sequence relay, is inherently a ground-fault detector, and is suitable for this purpose. In Fig. 7, however, for the phase-fault directional elements, we have illustrated a well-known type of voltage-restrained phase-fault directional relays DA—V, DB—V and DC—V, respectively, having voltage-restraint windings $DA_{vr}$, $DB_{vr}$, and $DC_{vr}$, in addition to the previously described polarizing or directional-torque-producing voltage-windings $DA_v$, $DB_v$ and $DC_v$. It is to be understood that this type of voltage-restrained directional element, or in general, a directional element which responds only to fault-conditions, could be utilized, also, in the other forms of embodiment of our invention.

In Fig. 7, we have further illustrated that we are not limited to any particular type of reliably responding directional fault-detecting relaying-means, as any desired form of such means or element can be substituted for any other form, in any of the forms of embodiment of our invention. In Fig. 7, the directional fault-detectors are shown as directionally supervised overcurrent-elements CR—O, CR—A, CR—B and CR—C, each of which is provided with a polarizing or torque-producing, cooperating winding CR—$O_p$, CR—$A_p$, CR—$B_p$, or CR—$C_p$, respectively, which is connected in series with the corresponding directional contacts DO, DA, DB and DC, respectively.

In Fig. 7, the direct tripping circuits, which are not supervised by loss of load, are shown as the circuits containing the contacts of the directionally supervised over-current relays CR—O, CR—A, CR—B and CR—C, respectively. The tripping circuits which are responsive to the loss-of-load elements, which are the back contacts of the overcurrent relays IA, IB and IC, are shown at 70, 71, 72 and 73, under the supervision of the selective fault-responsive directional elements DO, DA—V, DB—V, DC—V, respectively, and these directional contacts are also utilized to energize the timers T—O, T—A, T—B and T—C, respectively. The timer-contacts T—O, T—A, T—B, and T—C are connected in series with their respective loss-of-load tripping-circuits 70, 71, 72 and 73, in series with the loss-of-load back-contacts IA, IB and IC, or various combinations thereof.

Each timer-contact in Fig. 7 is shunted by a contact which is responsive to load-conditions, but not responsive to fault-conditions. To this end, we have shown three delta-current relays I—AB, I—BC and I—CA, which are energized from the delta-connected auxiliary current-transformers 12, and which are so calibrated, or time-delayed, or otherwise designed, as to be responsive only to sustained load-conditions. We desire it to be understood, however, that a load-current-responsive timer such as T-M in Fig. 6, or other, more elaborate means, may be utilized for the elements I—AB, I—BC and I—CA, for such selective load-condition response in Fig. 7.

It is believed that the operation of the system shown in Fig. 7 will be sufficiently clear from what has already been said. The various timers T—O, T—A, T—B and T—C are energized only when there is a fault of the type to which said relays respond, accompanied by a current-direction into the protected line-section at the relaying terminal. And the timer-contacts T—O, T—A, T—B, and T—C, respectively, interpose a time-delay in the respective loss-of-load tripping-circuits, only when said timer-contacts are not short-circuited by the parallel-connected load-responsive contacts I—AB, I—BC, I—CA and I—AB, respectively, or other more elaborate load-responsive contact-means, as will be well understood. Hence, a line-section which was not carrying current at the time when a fault occurs will not be permitted to trip, on loss of load, until the expiration of the time-settings of the corresponding timer T—O, T—A, T—B or T—C, said time-settings being adjusted as explained for the timer T-M in Fig. 6. However, if the protected line-section was carrying load at the time when the fault occurred, the timer-contacts are short-circuited, and loss-of-load tripping occurs without any time-delay after the dropping out of one or more of the overcurrent relays IA, IB or IC.

While the invention has been described and illustrated in connection with several illustrative forms of embodiment, it is to be understood that the invention is susceptible of embodiment of many different forms, without departing from its essential principles, and it is desired that the appended claims shall be accorded the broadest construction consistent with their language.

We claim as our invention:

1. Terminal protective equipment for protecting a terminal of a protected section of a polyphase line against faults involving less than all of the line-conductors, comprising reliably operative line-fault-responsive relaying-means for at times determining the existence of a fault within the protected line-section, uncertainly operative line-fault-responsive relaying-means for indicating the possibility of the existence of a fault on the system, with uncertainty whether the fault is within the protected line-section or beyond the far-end terminal thereof, loss-of-load relaying-means for determining the non-existence of predetermined load-conditions on at least one of the line-conductors of the protected line-section at the relaying terminal, control-circuit means for effecting a polyphase circuit-interrupting operation of the circuit-interrupting means at the relaying terminal in response to said reliable line-fault-responsive relaying-means, and control-circuit means for effecting a polyphase circuit-interrupting operation of the same circuit-interrupting means in response to a joint response of said uncertain line-fault-responsive relaying-means and said loss-of-load relaying-means.

2. Terminal protective equipment for protecting a terminal of a protected section of a polyphase line against faults involving less than all the line-conductors, comprising reliable line-fault-responsive relaying-means for detecting a fault within the protected line-section, directionally responsive relaying-means for indicating a line-current direction into the protected line-section at the relaying terminal, a plurality of load-responsive relaying-means, respectively associated with the several line-conductors of the protected section, for severally responding to predetermined load-conditions on that line-conductor, control-circuit means for effecting a polyphase circuit-interrupting operation of the circuit-interrupting means at the relaying terminal in response to said reliable line-fault-responsive relaying-means, and control-circuit means for effecting a polyphase circuit-interrupting operation of the same circuit-interrupting means in response to a response of said directionally responsive relaying-means, accompanied by an underload determination of at least one of said load-responsive relaying-means.

3. Terminal protective equipment for protecting a terminal of a protected section of a polyphase line against faults involving less than all of the line-conductors, comprising reliably operative line-fault-responsive relaying-means for at times determining the existence of a fault within the protected line-section, uncertainly operative, directionally responsive line-fault-responsive relaying-means for determining the existence of a fault on the polyphase line, with uncertainty whether the fault is within the protected line-section or beyond the far-end terminal thereof, loss-of-load relaying-means for determining the non-existence of predetermined load-conditions on at least one of the line-conductors of the protected line-section at the relaying terminal, control-circuit means for effecting a polyphase circuit-interrupting operation of the circuit-interrupting means at the relaying terminal in response to said reliable line-fault-responsive relaying-means, and control-circuit means for effecting a polyphase circuit-interrupting operation of the same circuit-interrupting means in response to a joint response of said uncertain line-fault-responsive relaying-means and said loss-of-load relaying-means.

4. A protective relay system for a terminal of a polyphase line-section, comprising a first relaying means for performing a relaying function affecting all of the conductors of the polyphase line-section with a response to predetermined line-fault conditions at said terminal involving less than all of the line-conductors within the protected line-section, and a second relaying means for performing a relaying function with a less discriminating response to line-fault conditions at said terminal involving less than all of the line-conductors, and with a directional response when the fault-current flows into the line-section at the relaying terminal, and also with a response to predetermined loss-of-load conditions on a sound line-conductor at said terminal.

5. A protective relay system for a terminal of a polyphase line section, comprising a first relaying means for performing a relaying function affecting all of the conductors of the polyphase line-section with a response to predetermined line-fault conditions at said terminal involving less than all of the line-conductors within the protected line-section, and a second relaying means for performing a relaying function with a response to a line-current direction into the protected line-section at the relaying terminal, and with a response to predetermined loss-of-load conditions on less than all of the line conductors of the protected line-section at said terminal.

6. Terminal protective equipment for protecting a terminal of a protected section of a polyphase line against faults involving less than all of the line-conductors, comprising the combination, with a polyphase line-segregating circuit-interrupting means at that terminal of the line-section, of line-fault-responsive relaying-means for reliably and quickly determining the existence of a fault within any part of the protected line-section except the part closest to the far-end terminal thereof, line-fault-responsive relaying-means for indicating the possibility of the existence of a fault on the system, with uncertainty whether the fault is within the protected line-section or beyond said far-end terminal, loss-of-load relaying-means for determining the non-existence of predetermined load-conditions on at least one of the line-conductors of the protected line-section at the relaying terminal, control-circuit means for effecting a polyphase circuit-interrupting operation of the circuit-interrupting means at the relaying terminal in response to said reliable line-fault-responsive relaying-means, and control-circuit means for effecting a polyphase circuit-interrupting operation of the same circuit-interrupting means in response to a joint response of said uncertain line-fault-responsive relaying-means and said loss-of-load relaying-means.

7. Terminal protective equipment for protecting a terminal of a protected section of a polyphase line against faults involving less than all of the line-conductors, comprising the combination, with a polyphase line-segregating circuit-interrupting means at that terminal of the line-section, of line-fault-responsive relaying-means for reliably and quickly determining the existence of a fault within any part of the protected line-section except the part closest to the far-end terminal thereof, directionally responsive relaying-means for indicating a line-current direction into the protected line-section at the relaying terminal, a plurality of load-responsive relaying-means, respectively associated with the several line-conductors of the protected section for severally responding to predetermined load-conditions on that line-conductor, control-circuit means for effecting a polyphase circuit-interrupting operation of the circuit-interrupting means at the relaying terminal in response to said reliable line-fault-responsive relaying-means, and control-circuit means for effecting a polyphase circuit-interrupting operation of the same circuit-interrupting means in response to a response of said directionally responsive relaying means, accompanied by an underload determination of at least one of said load-responsive relaying-means.

8. Terminal protective equipment for protecting a terminal of a protected section of a polyphase line against faults involving less than all of the line-conductors, comprising the combination, with a polyphase line-segregating circuit-interrupting means at that terminal of the line-section, of line-fault-responsive relaying-means for reliably and quickly determining the existence of a fault within any part of the protected line-section except the part closest to the far-end terminal thereof, directionally responsive line-fault-responsive relaying-means for determining the existence of a fault on the polyphase line, with uncertainty whether the fault is within the protected line-section or beyond said far-end terminal, loss-of-load relaying-means for determining the non-existence of predetermined load-conditions on at least one of the line-conductors of the protected line-section at the relaying terminal, control-circuit means for effecting a polyphase circuit-interrupting operation of the circuit-interrupting means at the relaying terminal in response to said reliable line-fault-responsive relaying-means, and control-circuit means for effecting a polyphase circuit-interrupting operation of the same circuit-interrupting means in response to a joint response of said uncertain line-fault-responsive relaying-means and said loss-of-load relaying-means.

9. A protective relay system for a polyphase line-section, comprising the combination, with a polyphase line-segregating circuit-interrupting means at each terminal of the protected line-section, of a first relaying means at each terminal for opening the polyphase circuit-interrupting means at the relaying terminal with a response to predetermined line-fault conditions at the relaying terminal involving less than all of the line-conductors at a distance less than a balance-point which falls within the protected line-section at a point near the other terminal thereof, and with a directional response when the fault-current flows into the line-section at the relaying terminal, and a second relaying means at each terminal for opening the polyphase circuit-interrupting means at the relaying terminal with a less discriminating response to line-fault conditions at the relaying terminal involving less than all of the line-conductors, and with a directional response when the fault-current flows into the line-section at the relaying terminal, and also with a response to predetermined loss-of-load conditions on a sound line-conductor at the relaying terminal.

10. A protective relay system for a polyphase line-section, comprising the combination, with a polyphase line-segregating circuit-interrupting means at each terminal of the protected line-section, of a first relaying means at each terminal for opening the polyphase circuit-interrupting means at the relaying terminal with a response to predetermined line-fault conditions at the relaying terminal involving less than all of the line-conductors at a distance less than a balance-point which falls within the protected line-section at a point near the other terminal thereof, and with a directional response when the fault-current flows into the line-section at the relaying terminal, and a second relaying means at each terminal for opening the polyphase circuit-interrupting means at the relaying terminal with a response to a line-current direction into the protected line-section at the relaying terminal, and with a response to predetermined loss-of-load conditions on less than all of the line-conductors of the protected line-section at the relaying terminal.

11. Terminal protective equipment for protecting a terminal of a protected section of a polyphase line against faults involving less than all of the line-conductors, comprising the combination, with a polyphase line-segregating circuit-interrupting means at that terminal of the line-section, of directional means for responding to current-direction into the protected line-section at that terminal, a first-zone distance-responsive fault-detecting means for responding to faults less remote than the other line-terminal, a plurality of load-responsive relaying-means, respectively associated with the several line-conductors of the protected section, for severally responding to predetermined load-conditions on that line-conductor, control means for opening the polyphase circuit-interrupting means at that terminal in response to a joint response of said directional means and said first-zone means, and control-means for opening the polyphase circuit-interrupting means at that terminal in response to a response of said directional means accompanied by an underload determination of at least one of said load-responsive relaying-means.

12. Terminal protective equipment for protecting a terminal of a protected section of a polyphase line against faults involving less than all of the line-conductors, comprising the combination, with a polyphase line-segregating circuit-interrupting means at that terminal of the line-section, of directional means for responding to current-direction into the protected line-section at that terminal, a first-zone distance-responsive fault-detecting means for responding to faults less remote than the other line-terminal, a more sensitive fault-detecting means, a loss-of-load relaying-means for responding to a loss of load on a sound line-conductor, control-means for opening the polyphase circuit-interrupting means at that terminal in response to a joint response of said directional means and said first-zone means, and control-means for opening the polyphase circuit-interrupting means at that terminal in response to a joint response of said directional means, said more sensitive fault-detecting means, and said loss-of-load means.

13. Terminal protective equipment for protecting a terminal of a protected section of a polyphase line against faults involving less than all of the line-conductors, comprising the combination, with a polyphase line-segregating circuit-interrupting means at that terminal of the line-section, of directional means for responding to current-direction into the protected line-section at that terminal without reliable discrimination with respect to the existence of a fault-condition, fault-responsive directional means for responding sensitively to fault-currents and to current-direction into the protected line-section at that terminal, a first-zone distance-responsive fault-detecting means for responding to faults less remote than the other line-terminal, a loss-of-load relaying-means for responding to a loss of load on a sound line-conductor, control-means for opening the polyphase circuit-interrupting means at that terminal in response to a joint response of said first-mentioned directional means and said first-zone means, and control-means for opening the polyphase circuit-interrupting means at that terminal in response to a joint response of said fault-responsive directional means and said loss-of-load means.

14. Terminal protective equipment for protecting a terminal of a protected section of a polyphase line against faults involving less than all of the line-conductors, comprising the combination, with a polyphase line-segregating circuit-interrupting means at that terminal of the line-section, of fault-responsive directional means for responding sensitively to fault-current and to current-direction into the protected line-section at that terminal, a first-zone distance-responsive fault-detecting means for responding to faults less remote than the other line-terminal, a loss-of-load relaying-means for responding to a loss of load on a sound line-conductor, control-means for opening the polyphase circuit-interrupting means at that terminal in response to a joint response of said directional means and said first-zone means, and control-means for opening the polyphase circuit-interrupting means at that terminal in response to a joint response of said directional means and said loss-of-load means.

15. Terminal protective equipment for protecting a terminal of a protected section of a polyphase line against faults involving less than all of the line-conductors, comprising the combination, with a polyphase line-segregating circuit-interrupting means at that terminal of the line-section, of fault-responsive directional means for responding sensitively to fault-currents and to current-direction into the protected line-section at that terminal, a first-zone distance-responsive fault-detecting means for responding to faults less remote than the other line-terminal, a plurality of load-responsive relaying-means, respectively associated with the several line-conductors of the protected section, for severally responding to predetermined load-conditions on that line conductor, control-means for opening the polyphase circuit-interrupting means at that terminal in response to a joint response of said directional means and said first-zone means, and control-means for opening the polyphase circuit-interrupting means at that terminal in response to a response of said directional means accompanied by an underload determination of at least one of said load-responsive relaying-means.

16. Terminal protective equipment for protecting a terminal of a protected section of a polyphase line against ground-faults, comprising the combination, with a polyphase line-segregating circuit-interrupting means at that terminal of the line-section, of zero-phase-sequence line-fault-responsive directional relaying-means for determining the existence of a ground-fault on the polyphase line, with uncertainty whether the fault is within the protected line-section or beyond the far-end terminal thereof, ground-fault detecting-means for discriminatingly responding to ground-faults which are less remote than said far-end terminal, a plurality of loss-of-load relaying-means respectively associated with the several line-conductors of the protected line-section for determining the non-existence of predetermined load-conditions on their respective line-conductors, control-circuit means for effecting a polyphase circuit-interrupting operation of the circuit-interrupting means at the relaying terminal in response to a response of said directional relaying-means accompanied by a ground-fault response of said discriminating detecting-means, and control-circuit means for effecting a polyphase circuit-interrupting operation of the same circuit-interrupting means in response to a response of said directional relaying-means accompanied by a loss-of-load determination of at least one of said loss-of-load relaying-means.

17. Terminal protective equipment for protecting a terminal of a protected section of a polyphase line against ground-faults, comprising the combination, with a polyphase line-segregating circuit-interrupting means at that terminal of the line-section, of line-fault-responsive relaying-means for reliably and quickly determining the existence of a ground-fault within any part of the protected line-section except the part closest to the far-end terminal thereof, time-hesitation zero-phase-sequence line-fault-responsive directional relaying-means for determining the existence of a ground-fault on the polyphase line, with uncertainty whether the fault is within the protected line-section or beyond the far-end terminal thereof, said time-hesitation relaying-means being responsive only to a continuance of the ground-fault indication during the period of a brief time-hesitation sufficient to cover the period when one line-conductor may be energized before another, during a circuit-closing operation of the circuit-interrupting means, a plurality of loss-of-load relaying-means respectively associated with the several line-conductors of the protected line-section for determining the non-existence of predetermined load-conditions on their respective line-conductors, control-circuit means for effecting a polyphase circuit-interrupting operation of the circuit-interrupting means at the relaying terminal in response to said reliable line-fault-responsive relaying-means, and control-circuit means for effecting a polyphase circuit-interrupting operation of the same circuit-interrupting means in response to a joint response of said uncertain directionally responsive relaying-means and at least one of said loss-of-load relaying-means.

18. Terminal protective equipment for protecting a terminal of a protected section of a polyphase line against ground-faults, comprising the combination, with a polyphase line-segregating circuit-interrupting means at that terminal of the line-section, of line-fault-responsive relaying-means for reliably and quickly determining the existence of a ground-fault within any part of the protected line-section except the part closest to the far-end terminal thereof, zero-phase-sequence line-fault-responsive directional relaying-means for determining the existence of a ground-fault on the polyphase line, with uncertainty whether the fault is within the protected line-section or beyond the far-end terminal thereof, a plurality of loss-of-load relaying-means respectively associated with the several line-conductors of the protected line-section for determining the existence or non-existence of predetermined load-conditions on their respective line-conductors, control-circuit means for effecting a polyphase circuit-interrupting operation of the circuit-interrupting means at the relaying terminal in response to said reliable line-fault-responsive relaying means, and control-circuit means for effecting a polyphase circuit-interrupting operation of the same circuit-interrupting means in response to a response of said uncertain relaying-means accompanied by a load-existing determination of at least one of said load-responsive relaying-means and an underload determination of at least another one of said load-responsive relaying-means.

19. Terminal protective equipment for protecting a terminal of a protected section of a polyphase line against single-phase ground-faults, comprising the combination, with a polyphase line-segregating circuit-interrupting means at that terminal of the line-section, of zero-phase-sequence line-fault-responsive directional relaying-means for determining the existence of a ground-fault on the polyphase line, with uncertainty whether the fault is within the protected line-section or beyond the far-end terminal thereof, ground-fault detecting-means for discriminatingly responding to single-phase ground-faults which are less remote than said far-end terminal, a plurality of loss-of-load relaying-means respectively associated with the several line-conductors of the protected line-section for determining the non-existence of predetermined load-conditions on their respective line-conductors, control-circuit means for effecting a polyphase circuit-interrupting operation of the circuit-interrupting means at the relaying terminal in response to a response of said directional relaying-means accompanied by a ground-fault response of said discriminating detecting-means, and control-circuit means for effecting a polyphase circuit-interrupting operation of the same circuit-interrupting means in response to a response of said directional relaying-means accompanied by a loss-of-load determination of the two loss-of-load relaying-means which are associated with the two sound line-conductors.

20. The invention as defined in claim 1, in combination with an inhibiting means associated with the loss-of-load control-circuit means, and means for rendering the inhibiting means substantially ineffectual in response to a predetermined load carried by the protected line-section immediately before the fault-condition occurs.

21. The invention as defined in claim 1, in combination with means for causing the loss-of-load control-circuit means to operate only after a time-delay when the fault-condition occurs at a time when the protected line-section was not carrying said predetermined load, and for causing said loss-of-load control-circuit means to operate promptly when the fault-condition occurs at a time when the protected line-section was carrying said predetermined load.

22. The invention as defined in claim 1, in combination with a time-delay means for conditioning the loss-of-load control-means so as to be ineffectual for a time-delay period after the energization of said time-delay means and for thereafter conditioning said loss-of-load control-means to be promptly responsive to a joint response of the uncertain line-fault-responsive relaying-means and the loss-of-load relaying-means, means for causing said time-delay means to be energized in response to a predetermined fault-condition on the system, and means for causing said time-delay means to be energized in response to said predetermined load-condition of the protected line-section.

23. Terminal protective equipment for protecting a terminal of a protected section of a polyphase line against faults involving less than all of the line-conductors, comprising current-responsive relaying-means for responding to a current-flow condition on less than all of the line-conductors of the protected line-section at said terminal, loss-of-load relaying-means for determining the non-existence of predetermined load-conditions on at least one of the line-conductors of the protected line-section at said terminal, and control-circuit means for effecting a polyphase circuit-interrupting operation of the circuit-interrupting means at the relaying terminal in response to a joint response of said current-responsive relaying-means and said loss-of-load relaying-means.

SHIRLEY L. GOLDSBOROUGH.
HARVEY P. SLEEPER.

REFERENCES CITED

The following references are of record in the file of this patent:

UNITED STATES PATENTS

| Number | Name | Date |
|---|---|---|
| 2,203,548 | Ryder | June 4, 1940 |